United States Patent
Rori et al.

(10) Patent No.: US 8,424,944 B2
(45) Date of Patent: Apr. 23, 2013

(54) INTEGRAL STRUCTURAL BULKHEAD FOR CARGO VANS

(75) Inventors: Hadrian A. Rori, Commerle, MI (US);
David B. Busch, Fishers, IN (US);
Rollin E. Nothwehr, Holland, MI (US)

(73) Assignee: Echo Automotive, Inc., Scottsdale, AZ (US)

(*) Notice: Subject to any disclaimer, the term of this patent is extended or adjusted under 35 U.S.C. 154(b) by 326 days.

(21) Appl. No.: 12/764,199

(22) Filed: Apr. 21, 2010

(65) Prior Publication Data

US 2010/0264681 A1 Oct. 21, 2010

Related U.S. Application Data

(60) Provisional application No. 61/214,240, filed on Apr. 21, 2009.

(51) Int. Cl.
*B63B 11/02* (2006.01)

(52) U.S. Cl.
USPC .................... 296/24.43; 296/193.07

(58) Field of Classification Search ............... 296/24.4, 296/24.43, 24.3, 187.03, 187.05, 187.12, 296/187.13, 186.1, 193.07; 410/121; 280/749; *B60J 7/00*
See application file for complete search history.

(56) References Cited

U.S. PATENT DOCUMENTS

| 6,120,089 | A * | 9/2000 | Kalstiantz et al. ......... 296/186.1 |
|---|---|---|---|
| 6,357,979 | B1 | 3/2002 | Montagna et al. |
| 6,474,713 | B1 | 11/2002 | Ruck et al. |
| 6,827,382 | B2 * | 12/2004 | Murray et al. ............. 296/24.46 |
| 7,195,297 | B2 * | 3/2007 | Murray et al. ............... 296/24.4 |
| 7,318,614 | B2 | 1/2008 | Steiger et al. |
| 7,494,177 | B2 | 2/2009 | Henning |
| 7,543,883 | B2 * | 6/2009 | Chen et al. ............... 296/203.03 |
| 7,607,709 | B1 | 10/2009 | Bryant |
| 7,784,885 | B2 * | 8/2010 | Steiger et al. ................. 312/107 |
| 2007/0057499 | A1 * | 3/2007 | Fengel et al. ................. 280/749 |
| 2007/0069542 | A1 * | 3/2007 | Steiger et al. .............. 296/24.44 |
| 2010/0066114 | A1 | 3/2010 | Winget et al. |
| 2010/0123338 | A1 | 5/2010 | Waters et al. |

OTHER PUBLICATIONS

49 CFR § 571.208 (pp. 7175-806), 2009.
49 CFR § 571.214 (pp. 908-924), 2009.
49 CFR § 571.216 (pp. 924-928), 2009.
49 CFR § 571.216(a) (pp. 928-933), 2009.
49 CFR § 571.219 (pp. 967-969), 2009.
49 CFR § 571.224 (pp. 996-999), 2009.

* cited by examiner

*Primary Examiner* — Glenn Dayoan
*Assistant Examiner* — Pinel Romain
(74) *Attorney, Agent, or Firm* — Barnes & Thornburg LLP

(57) ABSTRACT

A cargo van includes an integral structural bulkhead to separate a passenger compartment from a cargo area. The cargo van is designed such that the bulkhead wall contributes to the structural rigidity of the vehicle for purposes of meeting National Highway Traffic Safety Administration (NHTSA) requirements. That is, without the bulkhead, the cargo van would not meet NHTSA requirements. By designing the vehicle in this way, the overall vehicle weight is reduced as compared to vehicles in which bulkheads are optional add-ons.

15 Claims, 6 Drawing Sheets

INTEGRAL STRUCTURAL BULKHEAD FOR CARGO VANS

CROSS-REFERENCE TO RELATED APPLICATIONS

This application claims the benefit, under 35 U.S.C. §119 (e), of U.S. Provisional Application No. 61/214,240 which was filed Apr. 21, 2009 and which is hereby incorporated by reference herein.

BACKGROUND

The present disclosure relates to cargo vans and particularly, to bulkheads for cargo vans that separate passenger compartments from cargo areas. More particularly, the present disclosure relates to the manner of constructing the bulkhead and of fastening the bulkhead to the remainder of the vehicle.

Bulkheads in cargo vans that separate a passenger compartment from a cargo area of the van are known. See, for example, U.S. Pat. Nos. 7,318,614; 6,474,713; and 6,357,979 and U.S. Patent Application Publication No. 2010/0066114. Most prior art bulkheads are typically optional add-ons to the cargo vans in which they are installed. Thus, designers of prior art cargo vans have not relied on the optional bulkhead structure to meet design criteria for torsional rigidity and to meet governmental and industry requirements such as those set forth by the National Highway Traffic Safety Administration (NHTSA) for side impact structural performance or for rollover structural performance.

It is known that lighter vehicles have better fuel mileage efficiency than heavier vehicles. Additionally, for electric vehicles and hybrid electric vehicles, a lighter vehicle is preferred in order to enhance the acceleration response achieved by the electric motor of the vehicle. For many prior art cargo vans, the added weight of an optional bulkhead reduces fuel efficiency and acceleration performance.

SUMMARY

The present invention comprises one or more of the features recited in the appended claims and/or the following features which, alone or in any combination, may comprise patentable subject matter:

A cargo van may comprise a main body structure defining an interior region of the cargo van and a bulkhead situated in the interior region. The bulkhead may separate a passenger compartment portion of the interior region from a cargo area portion of the interior region. At least one National Highway Traffic Safety Administration (NHTSA) requirement may be met due to the enhanced structural rigidity afforded to the cargo van by the bulkhead and the at least one NHTSA requirement may not be met if the bulkhead is absent.

In some embodiments, the bulkhead may be made of a composite material such as a carbon fiber material. The bulkhead may be coupled to the body using a structural adhesive and at least one mechanical fastener, such as rivets. The main body structure may include a B-pillar and the bulkhead may be coupled directly to the B-pillar. The main body structure may have an annular vertical flange with a roof segment, a floor segment and a pair of side segments interconnecting the roof and floor segments, wherein the bulkhead has an outer peripheral region that abuts the annular vertical flange, and wherein the mechanical fasteners extend horizontally through the peripheral region of the bulkhead and the roof, floor, and side segments of the annular flange.

In some embodiments, the bulkhead may comprise insert features adapted to permit modular inserts to be coupled to the bulkhead. For example, the insert features may comprise apertures. Thus, the bulkhead may have a coupling region to which a plurality of interchangeable elements are selectively coupleable. The plurality of interchangeable elements may include a transparent section, an opaque section, and a section with a built-in storage compartment.

The NHTSA requirement which is met due to the presence of the bulkhead in the cargo van may include a requirement relating to side impact protection, occupant crash protection, or roof crush resistance. As mentioned previously, one or more of these NHTSA requirements may not be met if the bulkhead is absent from the cargo van. In this way, the bulkhead forms an integral part of the vehicle design and provides additional structural rigidity that is needed to meet the NHTSA requirements. Thus, the bulkhead may be coupled to the main body structure during manufacture rather than being a retrofitted add-on. For example, the bulkhead may be coupled to the main body structure with an adhesive that is cured by heat in a bake oven prior to application of paint to the main body structure.

According to an aspect of this disclosure, therefore, a cargo van may comprise a main body structure including a B-pillar with the main body structure defining an interior region of the cargo van. A bulkhead may be situated in the interior region to separate a passenger compartment portion of the interior region from a cargo area portion of the interior region. The bulkhead may be coupled to the B-pillar of the frame with structural adhesive and with mechanical fasteners.

In some embodiments, a pass-through opening is provided in the bulkhead. Alternatively or additionally, a door or window may be provided in the bulkhead. Further alternatively or additionally, one or more storage compartments may be coupled to or integrated into the bulkhead. Seat brackets may be coupled to or integral with the bulkhead to provide attachment points for coupling a seat back to the bulkhead.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which:

FIG. 3 is a partial perspective view, similar to FIG. 1, showing the bulkhead having an optional open pass-through;

DETAILED DESCRIPTION

Figure 1:
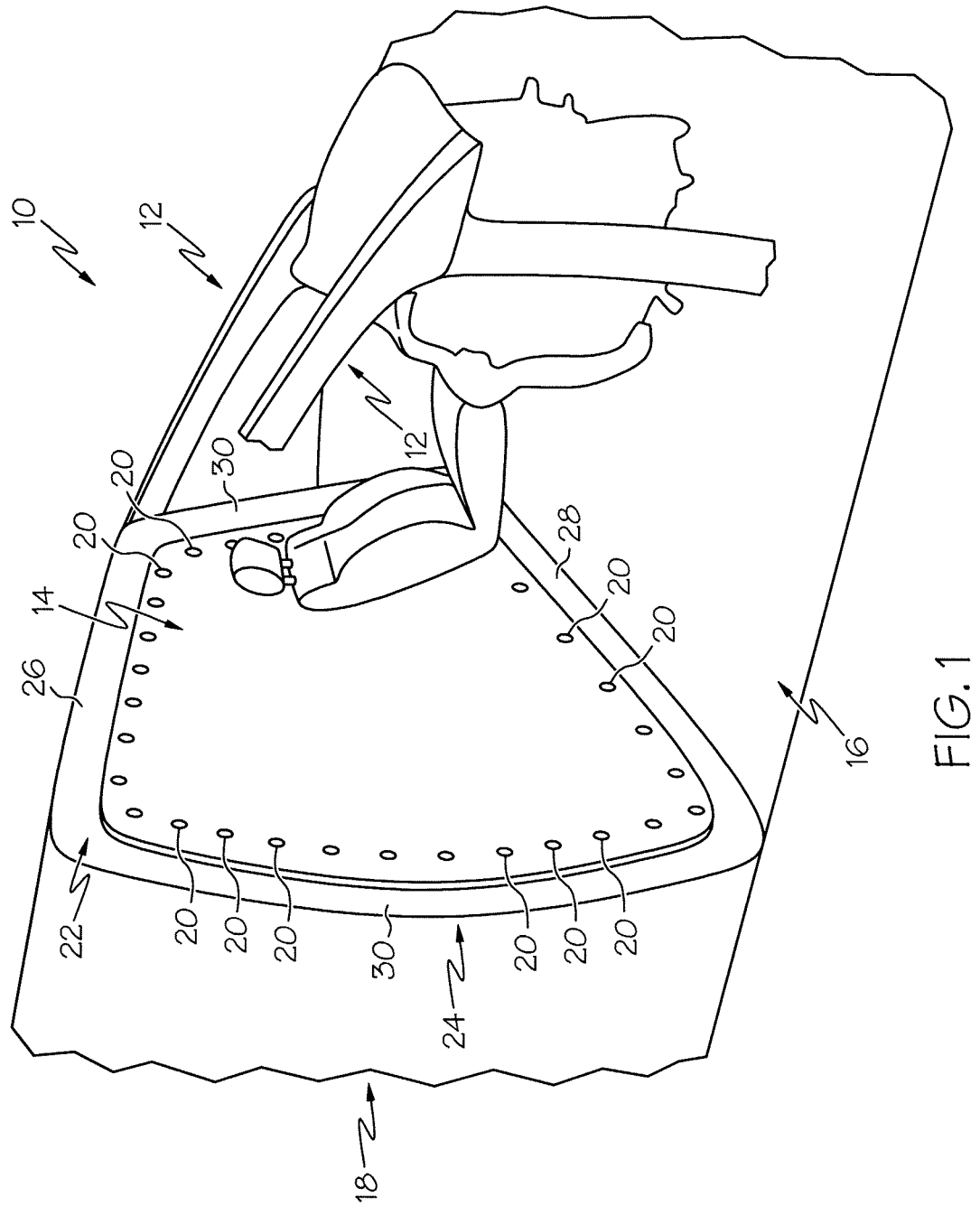
FIG. 1 is partial perspective view of a cargo van according to this disclosure, with portions broken away, showing a bulkhead coupled to a B-pillar of the cargo van.

A cargo van 10 includes a main body structure 12 and a bulkhead 14 situated in the interior region as shown, for example, in FIG. 1. The bulkhead 14 separates a passenger compartment portion 16 of an interior region of the van 10 from a cargo area portion 18 of the interior region. According to an aspect of this disclosure, the cargo van is designed such that bulkhead 14 is needed in order to meet certain design criteria set forth by the National Highway Traffic Safety Administration (NHTSA). Thus, certain NHTSA requirements are met due to the enhanced structural rigidity afforded to the cargo van 10 by the bulkhead 14 and one or more of these NHTSA requirements would not be met if the bulkhead 14 is absent. In this way, the bulkhead 14 forms an integral part of the vehicle design and provides additional structural rigidity that is needed to meet the NHTSA requirements.

Integrating the bulkhead 14 into the vehicle design contributes to reducing the overall weight of the cargo van 10 as compared to prior art cargo vans that offer bulkhead walls as optional add-ons. This is because the prior art vehicles having bulkheads as optional add-ons are designed to meet the NHTSA requirements with the bulkhead absent. However, once the bulkhead is added to the vehicle, the vehicle weight is increased. In some embodiments, vehicle 10 is a plug-in hybrid vehicle that is operated, under some conditions, as an electric vehicle. Accordingly, keeping the weight of cargo van 10 as low as feasible is desirable. Additional details of vehicle 10 are provided in U.S. Provisional Application No. 61/214,240 to which the present application claims benefit.

Not only does bulkhead 14 increase the torsional rigidity of main body structure 12 of cargo van 10, improve side impact structural performance, and improve rollover structural performance, it also reduces acoustic impact on the passenger compartment 16, provides a thermal barrier between the passenger compartment 16 and the cargo area 18 to reduce the size and energy consumption of the heating/cooling systems, and protects passengers from moving cargo. In the illustrative embodiments, bulkhead 14 comprises a flat or planar panel of material. However, in other embodiments, bulkhead 14 may take on other shapes including having formed ridges, ribs, depressions, and so on that tend to prevent bowing or deflection of bulkhead 14.

In some embodiments, the bulkhead 14 is made of a composite material such as a carbon fiber material. Use of carbon fiber material allows for an extremely stiff bulkhead 14 with very little added weight. This is not to say that other materials could not be used to construct bulkhead 14, if desired. In the illustrative embodiments, the bulkhead 14 is coupled to the main body structure 12 using the combination of a structural adhesive and at least one mechanical fastener, such as illustrative rivets 20. The main body structure 12 includes a B-pillar 22 and the bulkhead 14 is coupled directly to the B-pillar as shown, for example, in FIG. 1. In the illustrative example, the B-pillar 22 of the main body structure 12 includes an annular vertical flange 24 with a roof segment 26, a floor segment 28 and a pair of side segments 30 interconnecting the roof and floor segments 26, 28.

The bulkhead 14 has an outer peripheral region that abuts the annular vertical flange 24. The mechanical fasteners 20 extend horizontally through the peripheral region of the bulkhead and the roof, floor, and side segments 26, 28, 30 of the annular flange 24. The structural adhesive is provided between the peripheral region of the bulkhead 14 and the annular flange 24 of the B-pillar 22. It should be understood that, while the structural adhesive present between bulkhead 14 and flange 24 may have a tendency to keep these elements separated by a very small amount, they are still considered to be abutting one another in accordance with this disclosure.

It will be appreciated by those skilled in the art that a structural adhesive in the automotive industry connotes a type of glue that is so strong that it sometimes is tougher than the parent metal. It takes the place of welding in many applications. The glue of a structural adhesive is typically cured with heat in a bake oven after the body has been assembled but before paint. It is used extensively in the auto industry to join dissimilar materials where welding is impossible or very expensive. Most aluminum intensive vehicles also use these structural adhesives even though the materials are consistent because the welding of aluminum is very challenging. Thus, in one contemplated embodiment, the main body structure 12 is made of aluminum, or an aluminum alloy, and bulkhead 14 is made of carbon fiber material. Main body structure 12 may be made of other materials, including other metal materials, in other embodiments.

Although it is contemplated that the illustrative examples use structural adhesive of the type just described in combination with mechanical fasteners 20, it is within the scope of this disclosure for the structural adhesive or the mechanical fasteners 20 to be omitted. A regular type of glue or adhesive, such as one that does not need to be cured in a curing oven, may be used in lieu of the structural adhesive in other embodiments, for example. Another possibility is the use of screws or bolts, rather than rivets, as the mechanical fasteners. A further coupling example includes the integration of fingers or tabs in the bulkhead 14 that enter into slots, pockets, apertures, or the like provided in the main body portion 12 to which bulkhead 14 couples. Combinations of these various coupling mechanisms may be used, if desired.

Figure 2:
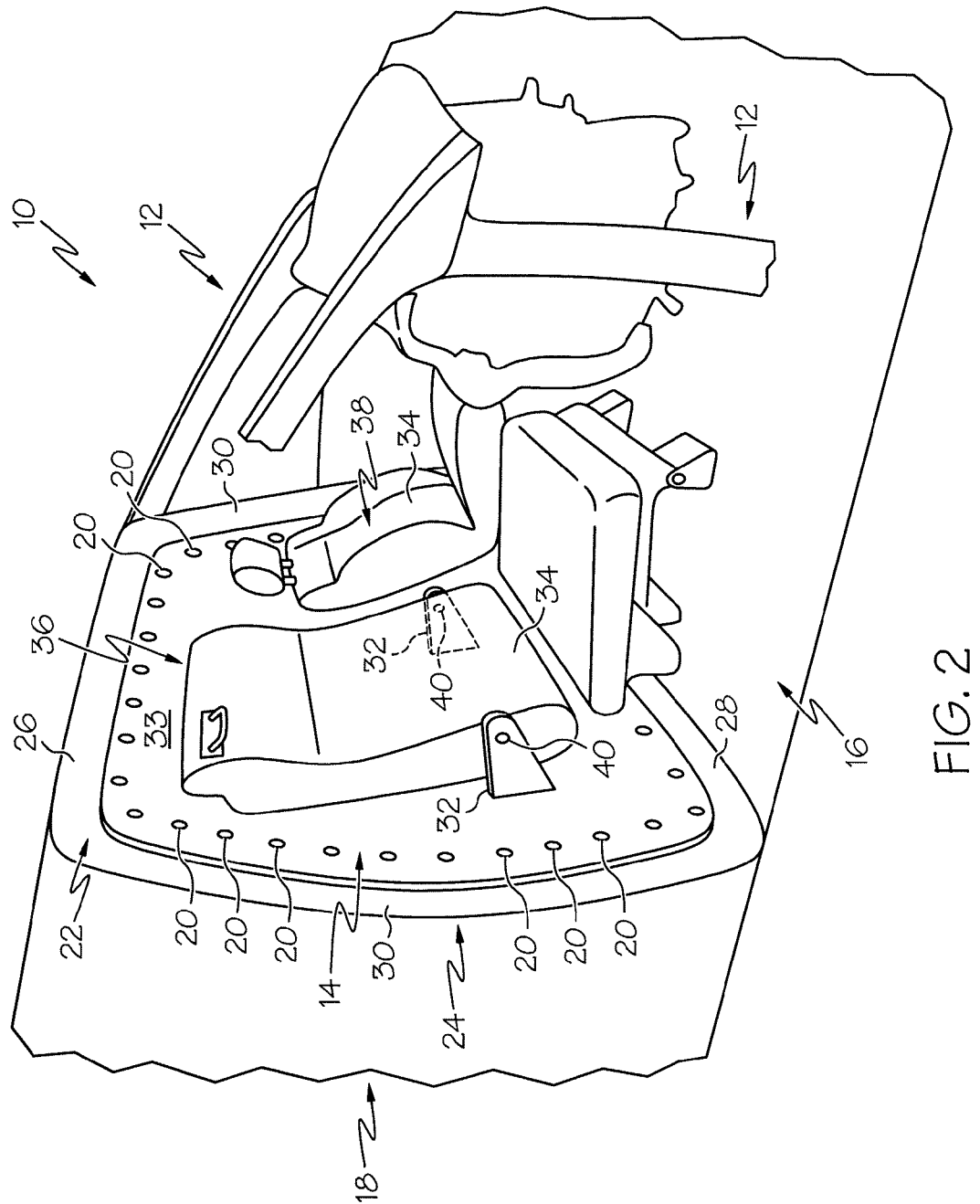
FIG. 2 is a partial perspective view, similar to FIG. 1, showing the bulkhead having a pair of optional seat brackets extending from a main vertical wall of the bulkhead.

While the bulkhead 12 shown in FIG. 1 comprises a generally solid, flat, planar element, the bulkhead 12 may include other features as shown in the examples given in FIGS. 2-6. In FIG. 2, for example, a pair of seat brackets 32 extending from a main vertical wall 33 of the bulkhead 14. Brackets 32 provide attachment points for a seat back 34 of a passenger seat 36. Similar brackets 32 may be used to couple seat back 34 of a driver seat 38 to wall 34 of bulkhead 14 in some embodiments. In some embodiments, seat back 34 of passenger seat 36 folds down to form part of a work desk in the manner shown and described in U.S. application Ser. No. 12/271,194 which was filed Nov. 14, 2008 and which is hereby incorporated by reference herein. In such embodiments, seat back 34 is pivotably coupled to brackets 32 with pivot pins 40, for example. The D-ring of a striker wire may be coupled to the bulkhead 14 for interaction with a releasable latch on the upper rear portion of seat back 34 as shown and described in U.S. application Ser. No. 12/271,194. The latch grips the striker wire to hold the seat back 34 of passenger seat 36 in the raised position.

Figure 3:
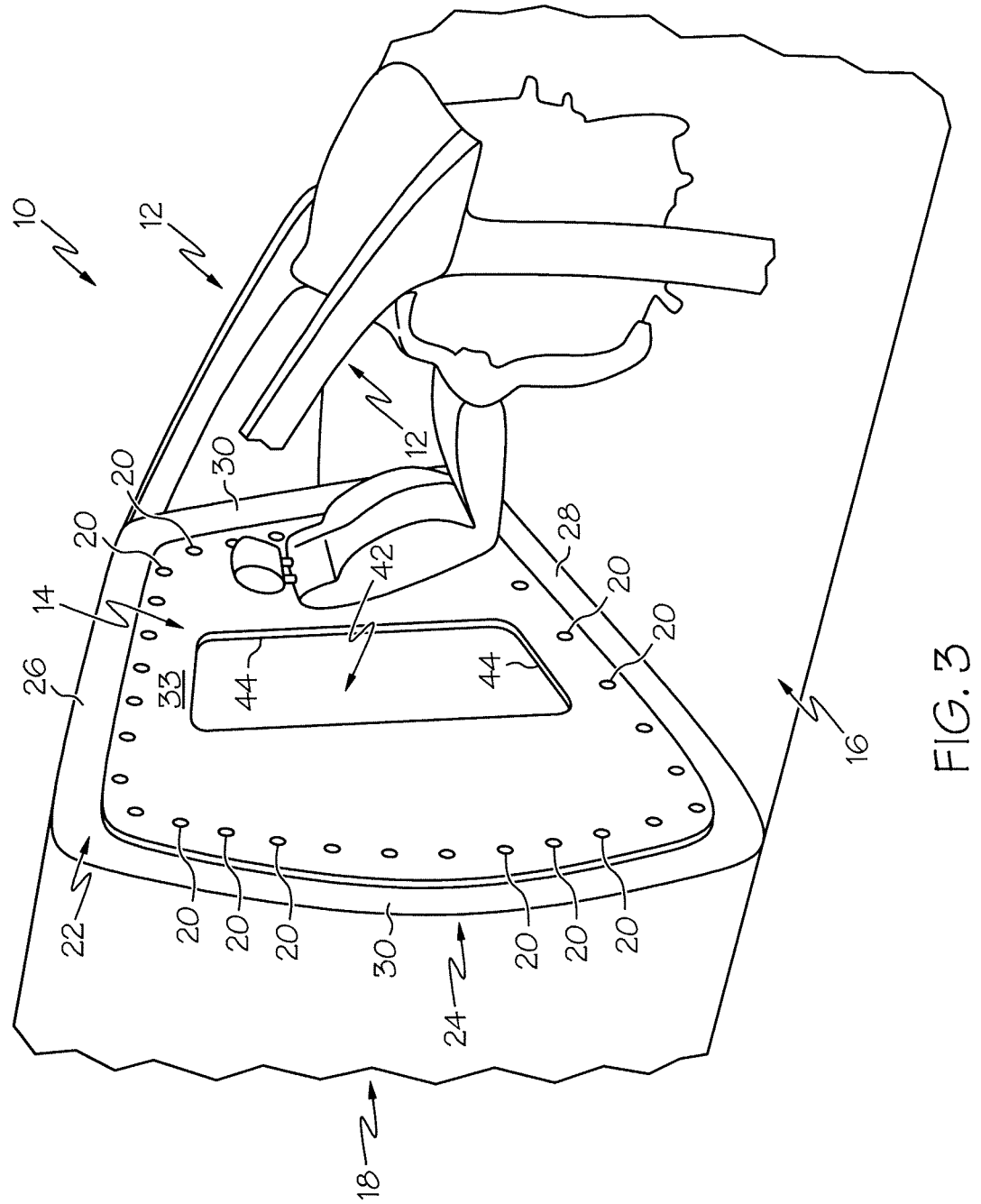

Referring now to FIG. 3, an open pass-through 42 is formed in bulkhead 14. Pass-through 42 is generally rectangular in shape and is sized to permit a person to move freely between the passenger compartment 16 and the cargo area 18. However, there is bulkhead material above and below pass-through 42. That is, the illustrative pass-through 42 does not extend up to the roof of the cargo van or down to the floor of the cargo van. The bulkhead material above and below pass-through 42 is coupled to the annular flange 24 of B-pillar 14 using structural adhesive and mechanical fasteners 20 just like described above in connection with the bulkhead 14 of FIG. 1. Also, in the illustrative example of FIG. 2, only driver seat 38 is present and the passenger seat has been omitted. In other embodiments in which bulkhead 14 has pass-through 42, a passenger seat may be included. If desired, a peripheral edge 44 which defines pass-though 42 may be covered by molding or a frame of some sort to enhance the aesthetics of the opening and/or to protect the bulkhead material at edge 44 from contact with persons or objects as they move through pass-through 42 between passenger compartment 16 and cargo area 18.

Figure 4:
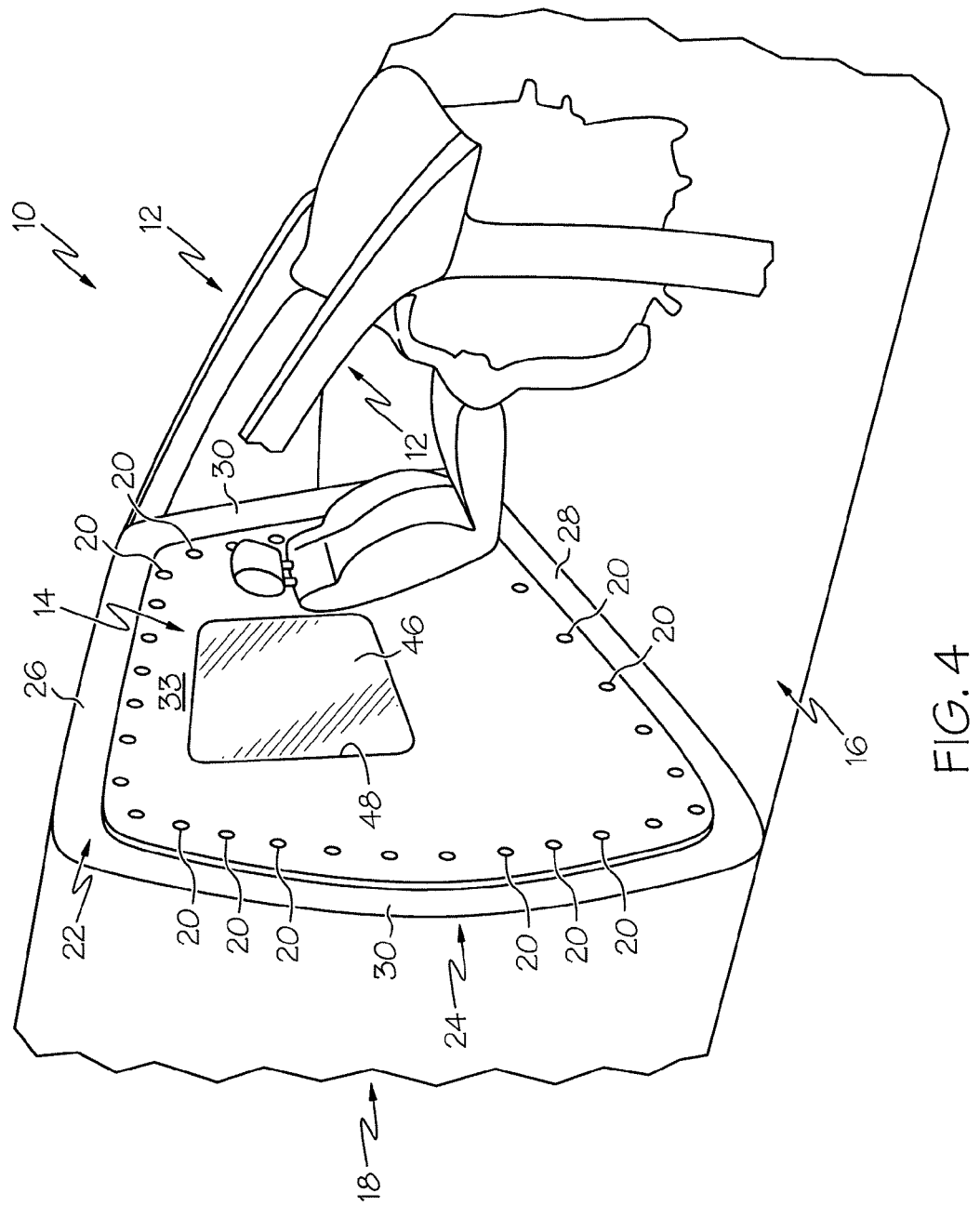
FIG. 4 is a partial perspective view, similar to FIG. 1, showing the bulkhead having an optional transparent window.

In the FIG. 4 example, bulkhead 14 has a transparent window 46 provided in a generally square-shaped opening 48 formed in the vertical wall 33 of bulkhead 14. In some embodiments, window 46 may slide or pivot between an opened position and a closed position. When window 46 is in the opened position, opening 48 serves as a pass-through so that a person in cargo area 18 can hand an object to a person in the passenger compartment 16 and vice versa. Opening 48 for window 46 can have a shape other than generally square in other embodiments. For example, the window opening may be rectangular or round just to list a couple of alternatives. A window sill or frame may be provided around opening 48 in some embodiments.

Figure 5:
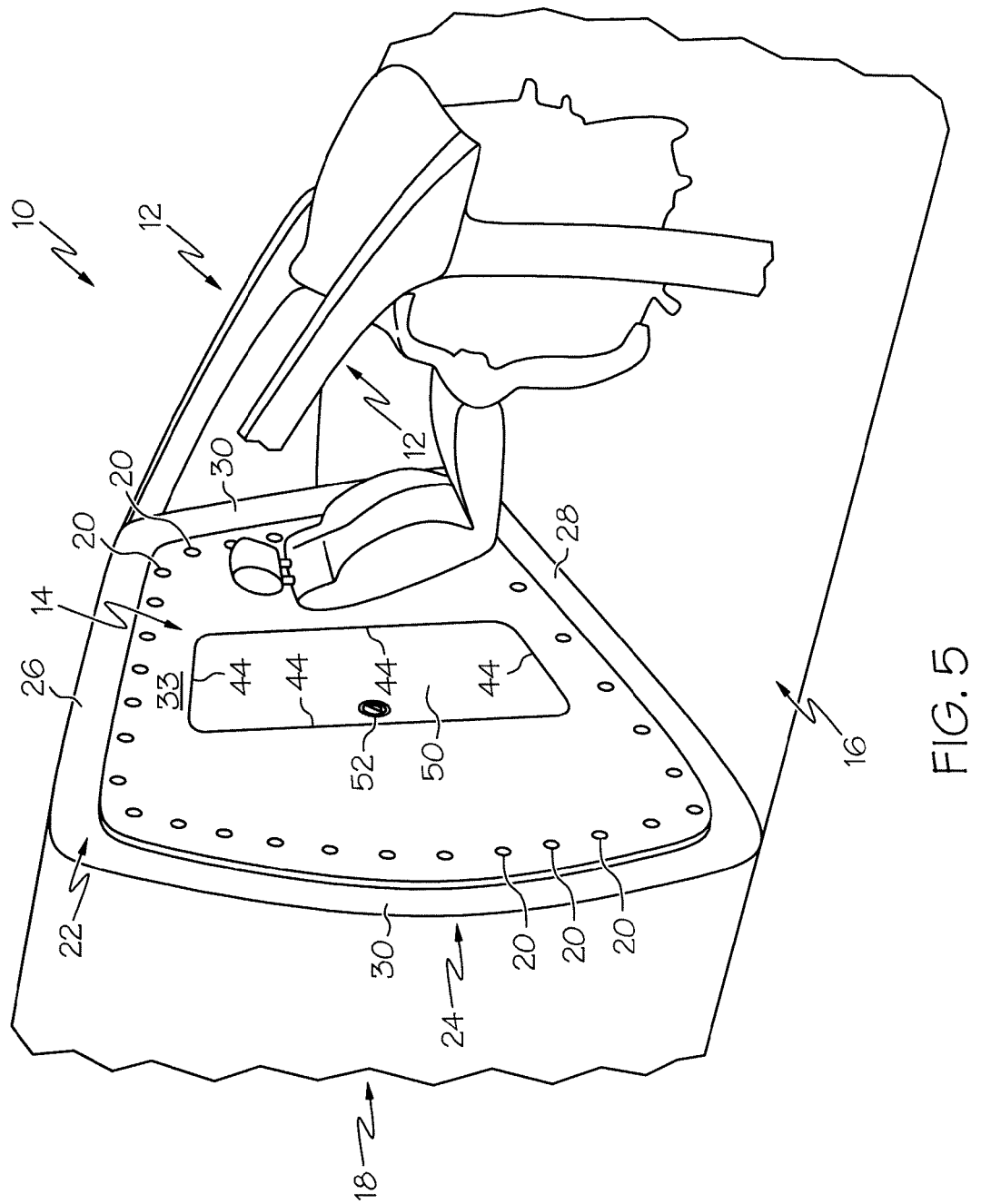
FIG. 5 is a partial perspective view, similar to FIG. 1, showing the bulkhead having an optional door with the door being shown in a closed position.

The FIG. 5 example is similar to the FIG. 3 example, except a door 50 is included in bulkhead 14 and is sized to fill the opening defined by peripheral edge 44 when in the closed position as shown in FIG. 5. Door 50 is movable from the closed position to an opened position to permit a person to move from the passenger compartment 16 to the cargo area 18 and vice versa. Thus, in some embodiments, one or more hinge mechanisms (not shown), which are well-known, are provided to connect door 50 to vertical wall 33 of bulkhead 14. Door 50 includes a door handle 52 in the illustrative example. Door handle 52 is movable to move a latch mechanism from a latched position to an unlatched position. When latched, the latch mechanism keeps the door 50 in the closed position and when the latch mechanism is unlatched, the door 50 can be opened. If desired, a lock can be provided for locking the door latch mechanism in the latched position.

Figure 6:
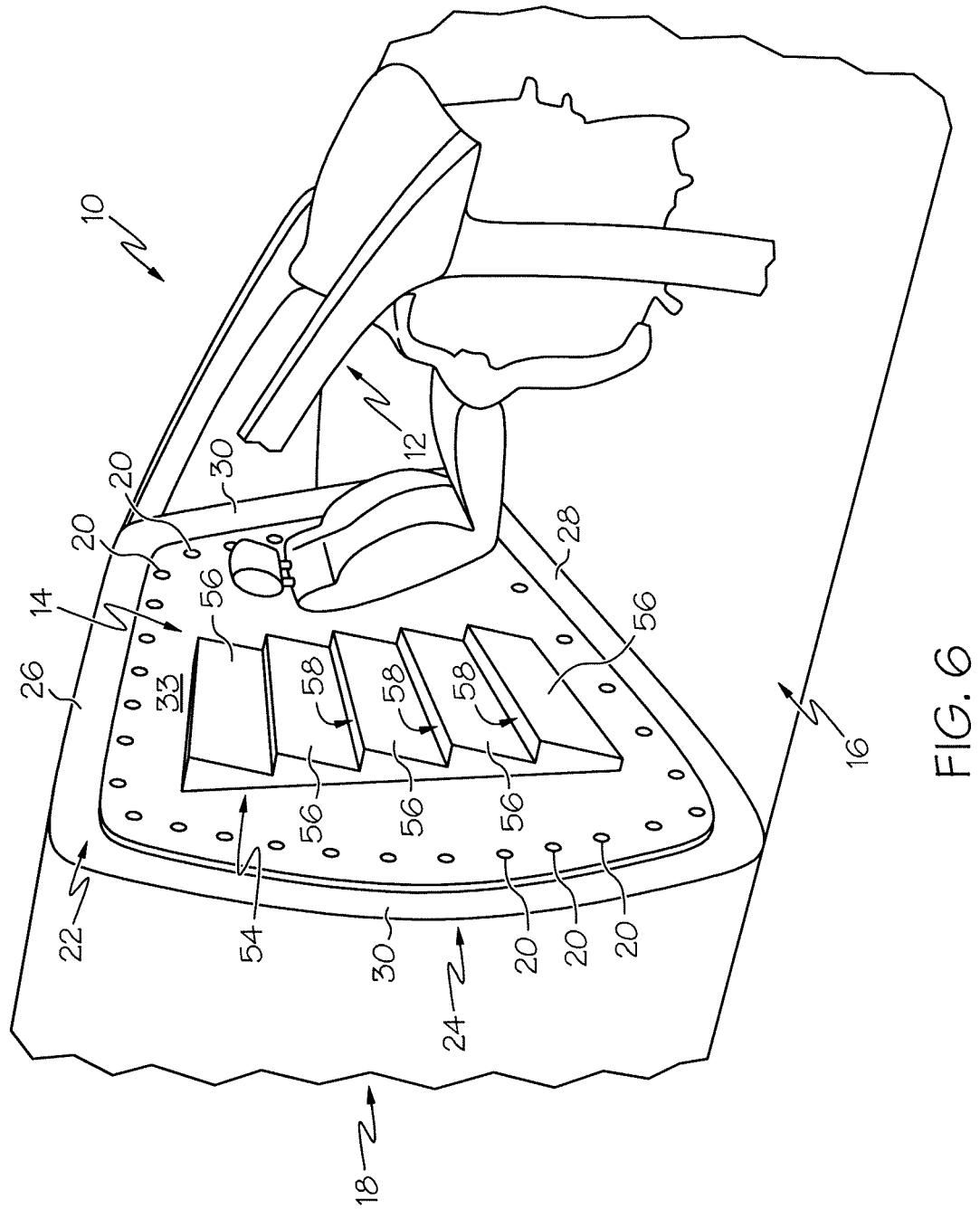
FIG. 6 is a partial perspective view, similar to FIG. 1, showing the bulkhead having an optional storage compartment.

Referring now to FIG. 6, the bulkhead 14 has a storage compartment 54. In some embodiments, compartment 54 may be formed integrally with wall 33 of bulkhead 14. In other embodiments, compartment 54 may be formed as a separate structure and attached to wall 33 of bulkhead 14. In those embodiments, in which compartment 54 attaches to wall 33, wall 33 may be formed with apertures, such as keyhole-shaped openings, that receive headed pegs therein, for example. The headed pegs, in such embodiments, project from a rear of compartment 54 for entry into the upper, enlarged portions of respective keyhole-shaped openings and then are moved downwardly into the lower, narrowed portions of the respective keyhole-shaped openings. The reverse arrangement in which a rear wall of compartment 54 has keyhole-shaped openings and the headed pegs extend outwardly from wall 33 of bulkhead 14 is anther coupling possibility. Other couplings such as bolts or screws could be used just as well for coupling compartment 54 to bulkhead 14.

In the illustrative embodiment, compartment 54 includes a set of angled bins 56 with each bin 56 having a top opening 58 for insertion of items into the respective bin 56. Bins 56 are well-suited to hold papers, books, manuals, notepads, or the like. However, bins 56 can hold other items like pencils, pens, staplers, rulers, calculators, and anything else that will fit within the bin 56 if desired. Of course, it is within the scope of this disclosure for storage compartments of other shapes to be coupled to or integrated with bulkhead 14. That is, compartment 54 with its set of open top, angled bins 56 is given as just one example of a storage compartment according to this disclosure.

Based on the foregoing, it will be appreciated that the bulkhead 14 may comprise insert features adapted to permit modular inserts to be coupled to the bulkhead. For example, the insert features may comprise apertures such as the keyhole-shaped openings described above. Thus, the bulkhead may have a coupling region to which a plurality of interchangeable elements are selectively coupleable. The plurality of interchangeable elements may include a transparent section, an opaque section, and a section with a built-in storage compartment. For example, storage compartment 54 could be detached from bulkhead 14 and other types of storage compartments attached to bulkhead 14 in its place in some embodiments.

As mentioned previously, the main body structure 12 includes B-pillar 22. As is known in the automotive industry, the B-pillar is part of the main body structure of the vehicle that supports the roof. Thus, the pillars serve as the beams for the walls with the exterior sheet metal serving as mostly a decorative cover. The pillars are designated from the front of the vehicle rearward. Therefore, the first pillar is called an A-pillar which is the vertical beam that is on the side of the front windshield. The B-pillar is typically just behind the front doors, C-pillar is usually behind the rear doors and D-pillar is used on vans and sport utility vehicles that have roofs extending beyond the rear doors. The pillars are usually constructed of multiple sheet metal parts that form a box section.

The illustrative B-pillar 22 is constructed in a manner that is the same or similar to that just described. However, it will be appreciated that, because bulkhead 14 provides additional structural rigidity to cargo van 10, the size of B-pillar 22 may be reduced as compared to prior art cargo vans. For example, the thickness of the sheet metal used to construct the B-pillar may be reduced and/or the exterior dimensions (such as width and thickness) of the resulting B-pillar may be reduced, thereby reducing the amount of vehicle weight attributable to main body structure 12, or at least attributable to the B-pillar of main body structure 12. The amount that the overall size of the B-pillar may be reduced or the amount that the thickness of the sheet metal of the B-pillar may be reduced is dependent upon a number of factors including the strength and thickness of bulkhead 14. The overall vehicle design and weight, of course, also plays a part. Accordingly, during the design process, computer aided modeling such as finite element analysis may be employed to determine how much B-pillar size and weight reduction may be achieved while still meeting NHTSA requirements.

According to this disclosure, the NHTSA requirements which are met due to the presence of the bulkhead in the cargo van may include, for example, one or more of the following: 49 C.F.R. §571.208 relating to occupant crash protection; 49 C.F.R. §571.214 relating to side impact protection; 49 C.F.R. §571.216 (as well as the upgraded standard of 49 C.F.R §571.216a) relating to roof crush resistance; each of the foregoing sections of 49 C.F.R. being hereby incorporated by reference herein. As mentioned previously, one or more of these NHTSA requirements may not be met if the bulkhead is absent from the cargo van. To reiterate with regard to the illustrative examples, the bulkhead 14 forms an integral part of the vehicle design and provides additional structural rigidity that is needed to meet one or more of the NHTSA requirements. It is possible that the presence of bulkhead 14 in cargo van 10 may also positively impact the performance of van 10 with regard to the NHTSA requirements set forth at 49 C.F.R. §571.219 relating to windshield zone intrusion and 49 C.F.R. §571.224 relating to rear impact protection.

Although certain illustrative embodiments have been described in detail above, variations and modifications exist within the scope and spirit of this disclosure as described and as defined in the following claims.

The invention claimed is:

1. A cargo van comprising
   a main body structure defining an interior region of the cargo van, and
   a bulkhead situated in the interior region and separating a passenger compartment portion of the interior region from a cargo area portion of the interior region, wherein the main body structure includes a B-pillar and the bulkhead is coupled directly to the B-pillar during manufacture of the cargo van, wherein the bulkhead comprises a single-piece unitary structure extending from top to bottom and side to side of the main body structure within the interior region.

2. The cargo van of claim 1, wherein the bulkhead is made of a composite material.

3. The cargo van of claim 2, wherein the composite material comprises a carbon fiber material.

4. The cargo van of claim 1, wherein the bulkhead is coupled to the main body structure using a structural adhesive and at least one mechanical fastener.

5. The cargo van of claim 4, wherein the at least one mechanical fastener comprises rivets.

6. The cargo van of claim 1, wherein the main body structure has an annular vertical flange with a roof segment, a floor segment and a pair of side segments interconnecting the roof and floor segments, wherein the bulkhead has an outer peripheral region that abuts the annular vertical flange, and wherein the mechanical fasteners extend horizontally through the peripheral region of the bulkhead and the roof, floor, and side segments of the annular flange.

7. The cargo van of claim 1, wherein the bulkhead comprises insert features adapted to permit modular inserts to be coupled to the bulkhead.

8. The cargo van of claim 7, wherein the insert features comprise apertures.

9. The cargo van of claim 1, wherein enhanced structural rigidity is afforded to the cargo van by the bulkhead relating to side impact protection.

10. The cargo van of claim 1, wherein enhanced structural rigidity is afforded to the cargo van by the bulkhead relating to roof crush resistance.

11. The cargo van of claim 1, wherein the bulkhead is coupled to the main body structure during manufacture with an adhesive that is cured by heat in a bake oven prior to application of paint to the main body structure.

12. The cargo van of claim 1, wherein the bulkhead has a coupling region to which a plurality of interchangeable elements are selectively coupleable.

13. The cargo van of claim 12, wherein the plurality of interchangeable elements includes a transparent section.

14. The cargo van of claim 12, wherein the plurality of interchangeable elements includes an opaque section.

15. The cargo van of claim 12, wherein the plurality of interchangeable elements includes a section with a built-in storage compartment.

* * * * *